United States Patent [19]

Rasums et al.

[11] Patent Number: 5,572,395
[45] Date of Patent: Nov. 5, 1996

[54] CIRCUIT FOR CONTROLLING CURRENT IN AN ADAPTER CARD

[75] Inventors: Todd M. Rasums, Cary; Frederick K. Yu, Durham, both of N.C.

[73] Assignee: International Business Machines Corporation, Armonk, N.Y.

[21] Appl. No.: 171,486

[22] Filed: Dec. 21, 1993

[51] Int. Cl.$^6$ .................................................. H02H 9/00
[52] U.S. Cl. ................................ 361/58; 361/18; 361/9
[58] Field of Search ........................ 361/58, 58.2, 111.3, 361/5, 6, 7, 8, 9, 10, 11, 13, 18; 323/908

[56] References Cited

U.S. PATENT DOCUMENTS

| | | | |
|---|---|---|---|
| 3,973,817 | 8/1976 | Stalley et al. | 339/14 R |
| 3,993,935 | 11/1976 | Phillips et al. | 317/101 C |
| 4,079,440 | 3/1978 | Ohnuma et al. | 361/424 |
| 4,245,270 | 1/1981 | Busby | 361/58 |
| 4,271,460 | 6/1981 | Baker | 363/49 |
| 4,494,064 | 1/1985 | Harkness | 323/908 |
| 4,510,553 | 4/1985 | Faultersack | 361/413 |
| 4,614,877 | 9/1986 | Knesewitsch et al. | 307/64 |
| 4,750,099 | 6/1988 | Inone et al. | 363/62 |
| 4,849,944 | 7/1989 | Matsushita | 371/21 |
| 4,867,659 | 9/1989 | Oda et al. | 439/355 |
| 4,927,382 | 5/1990 | Huber | 439/490 |
| 5,077,675 | 12/1991 | Tam | 364/480 |
| 5,079,455 | 1/1992 | McCafferty et al. | 361/11 |

FOREIGN PATENT DOCUMENTS

| | | | |
|---|---|---|---|
| 0386938 | 3/1990 | European Pat. Off. | H01R 23/70 |
| 0490010 | 12/1990 | European Pat. Off. | H02H 9/00 |
| 2056198 | 3/1981 | United Kingdom | H02J 1/00 |

OTHER PUBLICATIONS

IBM Technical Disclosure Bulletin, vol. 33, No. 8, Jan. 1991 New York, US pp. 223–227, XP 000106938, "Direct Access Storage Device (DASD) Concurrent Maintenance".
Preliminary Data Sheet No. PO–6.018. International Rectifier. IR2121. "Current Limiting MOS Gate Driver." pp. 9–15 No Date.
*IBM Technical Disclosure Bulletin.* "Sequential Contact Mating." vol. 31, No. 10, Mar. 1989, pp. 284–285.

*Primary Examiner*—Jeffrey A. Gaffin
*Assistant Examiner*—Ronald W. Leja
*Attorney, Agent, or Firm*—Steven B. Phillips; George E. Clark

[57] ABSTRACT

A circuit embodied within an adapter card for hot-plugging with a card slot in a card slot coupled to a processor based system utilizes a biasing circuit for ensuring that the input voltage to the load of the adapter card is of a sufficient magnitude. The circuit also includes a FET/feedback circuit for opening and closing the circuit provided between the input voltage to the adapter card and the load. This FET/feedback circuit operates as a constant current source to charge the input capacitance of the load and converts to a switched mode when the load capacitance is fully charged. The biasing circuit controls the FET/feedback circuit so that it remains open during hot-plugging of the adapter card into the card slot to alleviate pin arching. A monitor/timer circuit prevents the FET/feedback circuit from operating in the constant-current mode for no longer than a predetermined amount of time. A latch circuit is provided to turn off the FET within the FET/feedback circuit upon sensing of a transient current through the load.

23 Claims, 2 Drawing Sheets

CIRCUIT FOR CONTROLLING CURRENT IN AN ADAPTER CARD

TECHNICAL FIELD OF THE INVENTION

The present invention relates to adapter cards for computer systems, and more particularly, to a circuit for controlling application of current to a load within the adapter card.

BACKGROUND OF THE INVENTION

In many types of computer networking systems, which operate 24 hours a day, all year round, it is important that the system be serviceable and adaptable to modifications and growth in a non-disruptive manner so that the system can continue to operate without any interruption whatsoever when being serviced, modified or installed with additional components.

Such systems are commonly comprised of a plurality of adapter cards, each having their own set of functions, to facilitate easy replacement of defective components and installation of additional functionality and capacity, without requiring an entire shutdown of the system. Thus, it is advantageous for the adapter cards to be inserted and removed while the system is "hot" (i.e., the system remains on line during the installation or removal of the adapter card).

However, there is a problem associated with the plugging in and out of adapter cards while the system continues to remain powered up. The term "hot-plugging" is a system definition describing the making and breaking of the electrical interface, for which there exists a differential voltage potential, at the location where the adapter card is received in its associated socket within the system. One of the problems encountered with hot-plugging is due to the arcing of electricity across the electrical contacts while the interconnection is being made or broken. This resulting arcing can severely damage pin contacts by pitting the surface metal used on the contacts. Furthermore, the large change in current over a short period of time (di/dt value) associated with the near instantaneous connection of the power pins can be the source of both conductive and radiated noise, which may adversely degrade the performance of the rest of the system. This is particularly severe when hot-plugging an adapter card with high input capacitance. Additionally, when a card is inserted or withdrawn while the computer is powered and running, the sharp and sudden change of current through the inductive mother-board power path will induce voltage spikes, which will appear at both the card and the computer. These spikes may often be large enough to cause loss of data, incorrect program execution, or even permanent damage to the delicate hardware components.

Moreover, in a networking system where high availability/fault tolerance is required, hot-plugging a defective card with a low impedance fault (i.e., short circuit) can cause an unacceptable single-point failure. Likewise, a card which develops a low impedance fault during normal operation can also create a single-point failure.

Prior attempts to enable cards to be inserted or withdrawn in "power on" circumstances have proved less than satisfactory. One solution is the use of an "umbilical cord" to pre-charge the input capacitance of the adapter card. Nevertheless, there are disadvantages to the use of the umbilical cord solution. The umbilical cord's method requires an auxiliary power source and manual interconnection of an umbilical cord to the adapter card before the adapter card is allowed to be hot-plugged into the system. Power can then gradually be brought up on the card via a control device in the umbilical cord in a slow enough manner to avoid causing spikes. After the card is powered up, it can be inserted into the card slot and the umbilical cord removed.

However, the umbilical cord method leaves the computer's integrity wide open to technician error or neglect. If the technician forgets to attach the cord to the card, and inserts the card, spikes will result and may destroy the system. The technician may also neglect to adjust the umbilical cord's power control device before attaching the cord to the card, with similar results. Extraction of circuit cards from a live system using the umbilical cord method also poses similar hazards.

Another known method involves the use of large, cumbersome, and expensive power control units at each card slot in the computer. Since the card slots themselves are provided with the spike avoidance devices, this method is wastefully expensive since even unused card slots are equipped with the devices, so unneeded power control units must be purchased with the computer. Because the devices are large and power consuming, this method is also wasteful of electricity, as such a system will continually be ready to power up cards which may never be inserted. The addition of devices at the mother-board also substantially increases the impedance of the power path, with a corresponding increase in any spikes which do occur.

Two other solutions, a series resistance in the input voltage supply path and a slow turn-on field effect transistor ("FET") have been employed to pre-charge the input capacitance also. However, the time duration required to fully pre-charge the input capacitance with both series resistance and a slow turn-on FET can be unacceptably long, especially for systems which incorporate the use of staggered pins and require the logic supply to stabilize before the signal pins are interconnected.

Yet another unsatisfactory method for solving the above problem has been the development of a series inductance in the input voltage supply path. The series inductance method for hot-plugging is intended to limit the di/dt during insertion of the adapter card in order to prohibit pin arcing. However, this inductance increases the likelihood of pin arcing during the removal of the adapter card, as the inductor attempts to maintain current flow during the separation of the power pin contacts.

Thus, there is a need for a system and method for allowing hot-plugging of adapter power connectors with minimal pin damage and system disturbance.

There is a further need for a system and method for hot-plugging of adapter cards that does not require any additional manual steps besides the actual insertion or removal of the adapter card.

There is also a need for a system and method for hot-plugging of adapter cards which minimizes the charging of the input capacitance of the card during an insertion.

There is yet another need for a hot-plugging methodology that eliminates pin arcing during insertion and removal of an adapter card.

SUMMARY OF THE INVENTION

Thus, it is a primary object of the present invention to allow hot-plugging of adapter power connectors with minimal pin damage and system disturbance.

In the attainment of the above primary object, the present invention comprises a current-limited switching circuit including a series-pass MOSFET (metal oxide semi-conductor field-effect transistor), a monitor/timing circuit, a latching circuit and a biasing circuit. These circuits are coupled together and embodied within an adapter card so that the switch is placed in series within the electrical path provided within the adapter card for energizing the input load used by the card to energize its various components. Upon insertion of the adapter card into a card slot coupled to the processor-based system, the load receives power from the bulk power source within the main computing system. The main power source is coupled to the card slot and provided to connectors on the card slot, which couple with the power connectors on the adapter card upon insertion of the card into the slot. The load within the adapter card, which is often a high-impedance capacitive load, has a primary lead and a reference lead, which couple to the primary and reference leads leading to the power connectors on the card slot.

In a preferred embodiment of the present invention, the primary and reference connectors on the card slot are of a specified length. A third connector on the card slot, which is coupled to the aforementioned primary connector, is adaptable for coupling with a power connector leading to the circuit of the present invention on the adapter. This third connector is of a length shorter than the aforementioned primary and reference connectors so that application of power to the circuit of the present invention is accomplished subsequent to interconnection of the respective primary and reference connectors of the card slot and adapter card for reasons set forth below.

The third connector provides electrical energy to the aforementioned biasing, latching, monitoring/timing and switching circuits. Upon hot-plugging of the adapter card into the card slot, the bulk energy source within the processor-based system will be interconnected to the primary and reference leads coupled the load within the adapter card. However, since the third connector on the card, hereinafter referred to as the enable input, has not yet made contact with the corresponding third connector means on the card slot, no power is supplied to the switching circuit placed in series with the load, thus placing the switch in an "off" operating state thereby causing an open circuit to the load.

Upon interconnection of the third connector on the card slot to the enable input of the circuit of the present invention, the biasing circuit senses the presence of the now present voltage and activates the switch if the voltage potential exceeds a voltage lockout threshold level predetermined within the biasing circuit. Should the impedance of the load during hot-plugging of the adapter card be sufficiently low, the MOSFET will begin operating in a constant-current mode, limiting current flow to a predetermined value. The MOSFET will continue to operate in the linear region as a true current source as long as the load impedance is low enough (or current magnitude is high enough) to activate the constant-current mode of operation. Conversely, should the input impedance of the load be sufficiently high upon hot-plugging of the card, resulting in a current magnitude lower than the pre-selected constant-current value, the switch will begin operating in a switched mode. The switched mode operation is the normal operating state of the present invention characterized by low series resistance and minimal voltage drop within the circuit of the present invention.

If the impedance of the load during hot-plugging is largely capacitive, the MOSFET will begin operation in a constant-current mode, charging the capacitor at a linear rate. Once the capacitor is fully charged, the switch will automatically convert to the switched mode of operation. The switching circuit will remain in this switched mode unless either an over-current fault condition occurs or the input voltage drops below the previously mentioned voltage lockout threshold. At such time, the biasing circuitry will gate off the MOSFET, effectively opening the switch.

To insure that the MOSFET always operates within a safe operating area for allowable power dissipation, the monitor/latch circuitry activates a timer sequence at the beginning of the constant-current mode. The monitor/latch functions will disable the current-limiting circuitry of the present invention should the predetermined time limit allowed for constant-current mode operation expire. This circuitry protects the MOSFET (and the system) should there be a sustained low impedance fault state on the adapter card during a hot-plug.

A fast feedback path is also provided directly to the latch circuitry from the load which will immediately deactivate the MOSFET should a transient fault develop during normal switched-mode operation. The short time duration to clear and isolate the fault state is critical to protect against input bulk voltage disturbances which may adversely impact the system. Conversely, a simple fuse is not sufficient protection due to the long time duration required to clear the fault condition. The present invention clears the fault condition approximately one-hundred times faster than a fast-acting fuse, and is resettable via the remote on/off feature discussed below.

In another preferred embodiment of the present invention, the current-limited switching circuitry of the present invention provides a means of minimizing the time duration required for charging the input capacitance to near theoretical limits by sourcing the maximum amount of current possible to the load without disturbing the input bulk voltage. The constant-current magnitude previously discussed is chosen to be a value which will not over-current the bulk supply even if the power system is operating at full capacity, and this maximum current level is maintained during the full charge duration of the load capacitance. If the adapter card uses on-card DC/DC converters to generate the logic supply voltages for the components within the adapter card, these converters need not be gated active at any special time. Rather, the present invention allows the converters to turn on whenever the input voltage is high enough to activate normal operation, further minimizing the time required to stabilize the logic supply voltage.

In yet another preferred embodiment of the present invention, a compensation capacitor is coupled to the MOSFET to stabilize the negative feedback loop from the load to the switching circuit thus slowing the di/dt of the rising edge of the input current waveform at turn-on, reducing both conductive and radiated noise which could otherwise be a source of electromechanical interference ("EMI") disturbances and adversely degrade the performance of the rest of the system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DRAWINGS

Figure 1:
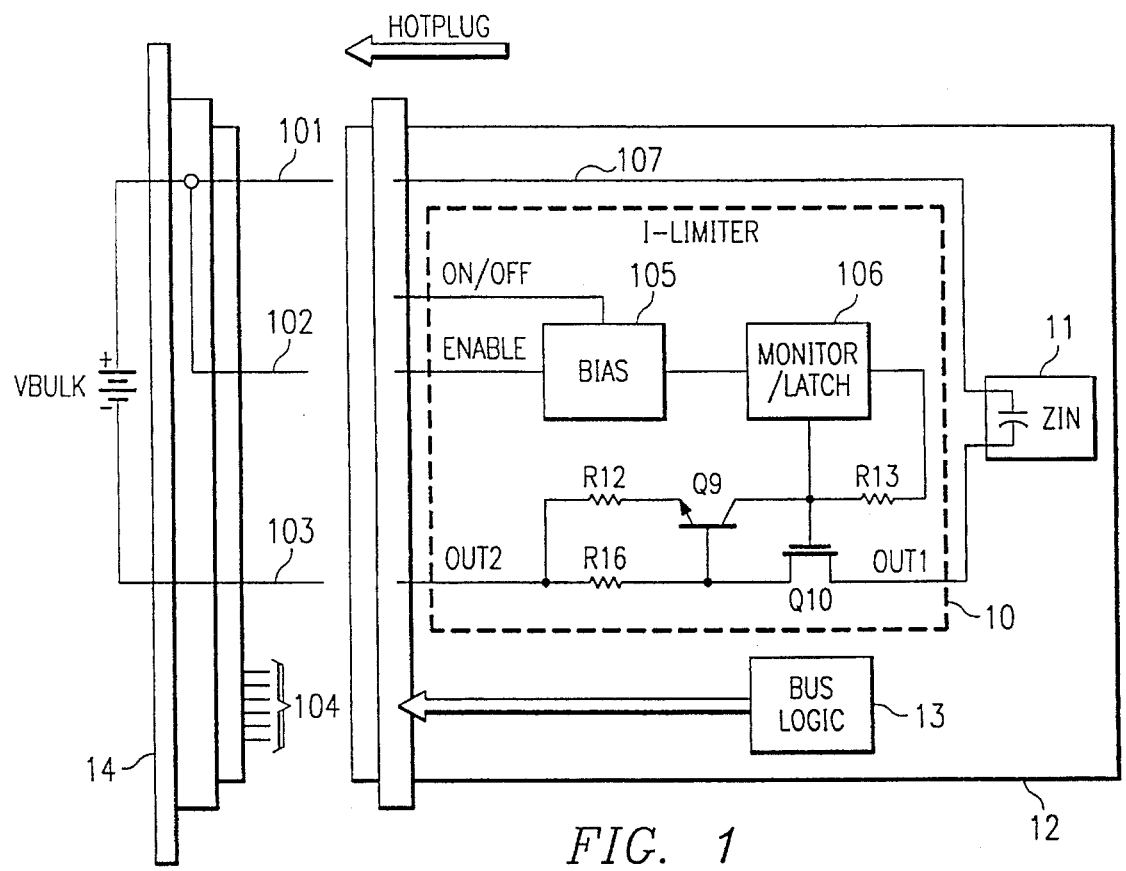
FIG. 1 illustrates an implementation of the present invention when hot-plugging an adapter card into a card slot.

Referring now to the Drawings, wherein like reference characters designate like or corresponding parts throughout several views, FIG. 1 illustrates circuit 10 of the present invention embodied within adapter card 12 shown in near engagement with card slot 14 coupled to bulk voltage VBULK, which will be shown to be coupled to a processor-based system as discussed below with respect to FIG. 4. The directional arrow illustrates that adapter card 12 is being manually "plugged" in engagement with card slot 14. The term "HOTPLUG" is used in FIG. 1 to indicate that source voltage VBULK is currently activated and applied to card slot 14 for use by card 12 upon insertion.

Adapter card 12 includes bus logic 13 containing the various electrical and microelectronic components embodied within card 12. Bus logic 13 may provide any one of various functions currently available or yet to be developed for use by a processor-based system. Bus logic 13 is shown to be adaptable to couple with multipin connector 104 of card slot 14 so as to couple bus logic 13 to the aforementioned processor-based system coupled to card slot 14 (see FIG. 4).

Adapter card 12 also includes load 11, shown in this particular embodiment to be a capacitive load. Load 11, which may in one embodiment be one or more DC/DC converters, is adapted to receive power from VBULK and to transfer this power to bus logic 13 for use by its components in a manner well known in the art.

Energy source VBULK is coupled to card slot connectors 101–103. In a preferred embodiment of the present invention, connector 101 is longer than both connectors 102 and 103, and connector 103 is longer than connector 102 for reasons to be discussed below. Note that connectors 101 and 102 are coupled together.

Any one of the well-known methods for coupling card 12 and card slot 14, and for coupling their corresponding connector means may be employed within the present invention.

Circuit 10 of the present invention has four external terminals. Terminals OUT1 and OUT2 are portions of the series circuit that includes voltage source VBULK and load 11. Terminal OUT2 is adaptable for coupling with connector 103 and terminal ENABLE is adaptable for coupling with connector 102 of card slot 14. Terminal ON/OFF is adaptable for coupling to a connector (not shown) on card slot 14, which may be coupled to the processor-based system for a purpose to be discussed below.

Circuit 10 comprises bias circuitry 105, monitor/latch circuitry 106, resistors R12, R13 and R16, transistor Q9 and MOSFET Q10. Terminal OUT1 couples MOSFET Q10 to one terminal of load 11.

Figure 2:
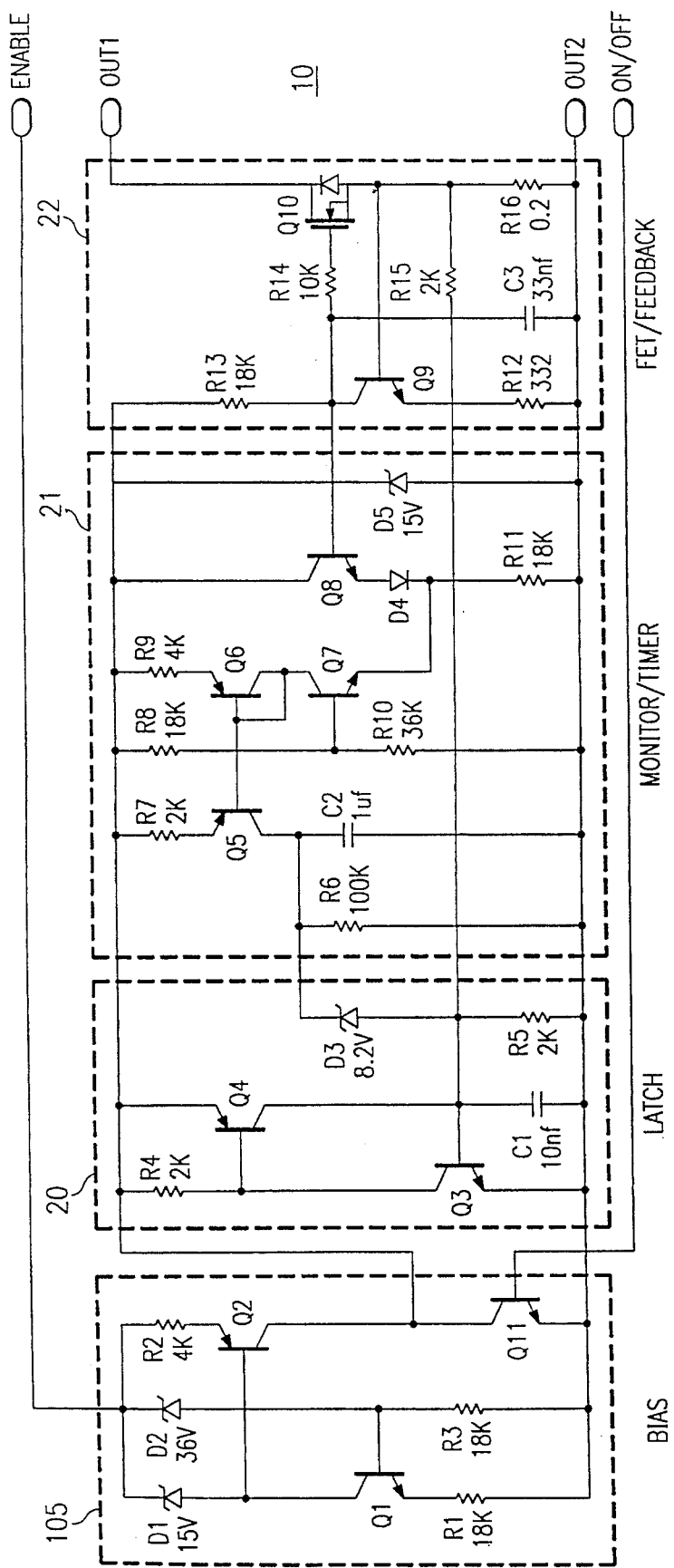
FIG. 2 illustrates a circuit diagram of the present invention.

Referring next to FIG. 2, there is shown a detailed circuit diagram of circuit 10 of the present invention. Note that the dashed outlines illustrate the various components of circuit 10 previously described. Circuit 105 is bias circuitry 105 as illustrated in FIG. 1. Circuit 20 is the latch circuitry, circuit 21 is the monitor/timing circuitry and circuit 22 is the FET/feedback circuitry. In a preferred embodiment, the various components of circuit 10 have the values shown in FIG. 2.

Bias circuit 105 is coupled to the enable terminal and supplies energy for circuits 20–22.

Referring to FIGS. 1 and 2 in conjunction, when card 12 is hot-plugged into card slot 14, connector 101 first couples with terminal 107 connected to load 11. Immediately thereafter, connector 103 couples with terminal OUT2. At this moment in time, connector 102 and the ENABLE terminal of circuit 10 have not yet joined. As a result, bias circuit 105 is not energized and does not provide any power to circuits 20–22. More particularly, MOSFET Q10 is not supplied with any gate voltage resulting in MOSFET Q10 being placed in an "OFF" operating state, thereby resulting in an open circuit between voltage source VBULK and load 11. The advantage of this configuration is that voltage source VBULK is first coupled to terminals 107 and OUT2 on adapter card 12 yet no current is allowed to flow since switch Q10 has opened the circuit. This alleviates arcing across connectors 101 and 103 to terminals 107 and OUT2, respectively, on adapter card 12 during hot-plugging of card 12 and card slot 14.

As adapter card 12 is further seated within card slot 14, connector 102 eventually couples with the ENABLE terminal. Thereafter, multipin connector 104 couples with the corresponding terminals on card 12 (not shown) to thereby couple bus logic 13 through card slot 14 to the associated processor-based system (see FIG. 4).

Bias circuit 105 includes zener diode D2 having a voltage of 36 volts coupled between the ENABLE terminal and the base electrode of transistor Q1. The collector electrode of transistor Q1 is coupled to the anode of zener diode D1 having a voltage of 15 volts, the cathode of zener D1 being coupled to the ENABLE terminal. The emitter electrode of transistor Q1 is coupled to resistor R1, which is also coupled to terminal OUT2. Resistor R3 is coupled between the base electrode of transistor Q1 and terminal OUT2. Furthermore, resistor R2 is coupled between the ENABLE terminal and the emitter electrode of transistor Q2, whose collector electrode is coupled to the collector electrode of transistor Q11. The emitter electrode of transistor Q11 is coupled to terminal OUT2, and the base electrode of transistor Q11 is coupled to the ON/OFF terminal. Additionally, the collector electrode of transistor Q2 supplies energy to circuits 20–22.

Latch circuit 20 comprises a silicon-controlled rectifier ("SCR") arrangement, which includes transistors Q3 and Q4. The emitter electrode of transistor Q4 is coupled to the collector electrode of transistor Q2. Additionally, resistor R4 is coupled between the base electrode of transistor Q4 and the collector electrode of transistor Q2. The base electrode of transistor Q4 is coupled to the collector electrode of transistor Q3, which has its emitter electrode coupled to terminal OUT2. Furthermore, the collector electrode of transistor Q4 is coupled to the base electrode of transistor Q3, which is also coupled through capacitor C1 to terminal OUT2. Capacitor C1 is coupled in parallel with resistor R5. Zener diode D3 is coupled between the base electrode of transistor Q3 and circuit 21. Additionally, the base electrode of transistor Q3 is coupled through resistor R15 to the source electrode of FET Q10.

Circuit 21 couples the collector electrode of transistor Q2 to the emitter electrode of transistor Q5 through resistor R7, the base electrode of transistor Q7 through resistor R8, the emitter electrode of transistor Q6 through resistor R9, the collector electrode of transistor Q8 and the cathode of diode D5. The collector electrode of transistor Q5 is coupled to the cathode of diode D3 and is furthermore coupled to terminal OUT2 by the parallel arrangement of resistor R6 and capacitor C2. The base electrodes of transistors Q5 and Q6 are coupled together, and the base electrode of transistor Q6 is coupled to its collector electrode, which is also coupled to the collector electrode of transistor Q7. Furthermore, the base electrode of transistor Q7 is coupled to terminal OUT2 through resistor R10. The emitter electrode of transistor Q7 is also coupled to terminal OUT2 through resistor R11. Transistors Q5 and Q6 are thus arranged in a mirrored current source configuration. Transistors Q7 and Q8 are arranged as a differential pair of transistors. The emitter electrode of transistor Q8 is coupled to the anode of diode D4 which has its cathode coupled to terminal OUT2 through resistor R11. Lastly, the anode of diode D5 is coupled to terminal OUT2.

Circuit 22 comprises MOSFET Q10 which has its drain electrode coupled to terminal OUT1 and its source electrode coupled to terminal OUT2 through resistor R16. A parasitic diode joins the drain and source electrodes in MOSFET Q10. Additionally, the base electrode of MOSFET Q10 is coupled to the source electrode. The gate electrode of FET Q10 is coupled to the base electrode of transistor Q8 through resistor R14. The gate electrode of transistor Q8 is also coupled to the collector electrode of transistor Q2 through resistor R13 and to terminal OUT2 through capacitor C3. Circuit 22 also includes transistor Q9 having its collector electrode coupled to the base electrode of transistor Q8, its emitter electrode coupled to terminal OUT2 through resistor R12 and its base electrode coupled to the source electrode of FET Q10.

Referring again to FIGS. 1 and 2 in conjunction, bias circuit 105 provides the bias current required to power circuits 20–22. Bias circuit 105 is activated when the voltage potential provided to the ENABLE terminal exceeds the zener voltage of diode D2 plus about 1 volt. A 3.5 mA output bias current is established by the constant-current source formed by transistor Q2, diode D1 and resistor R2. The supply voltage for circuits 20–22 is provided by zener diode D5, and will be maintained as long as (1) bias circuit 105 is activated, (2) transistor Q11 is not saturated, and (3) latch circuit 20 is not activated.

FET/feedback circuit 22 senses the current magnitude flowing between terminals OUT1 and OUT2 and will operate in either a constant-current or switched mode of operation. The current is monitored via the voltage drop established across sense resistor R16, and will bias active feedback transistor Q9 if the voltage drop exceeds approximately 0.8 volts. A negative feedback path to the gate electrode of FET Q10 is formed by transistor Q9 and resistors R12 and R13. The feedback path, when activated, allows FET Q10 to operate in its linear region as a true constant-current source. If the current magnitude sensed by resistor R16 is not sufficient to activate the feedback path, the gate voltage of FET Q10 will rise to the zener voltage of D5, approximately 15 volts, driving FET Q10 hard into its ohmic region of operation characterized by low "on" resistance. Capacitor C3 provides a dominant pole for proper feedback loop stability, and also limits the resultant di/dt between terminals OUT1 and OUT2 during hot-plugging of adapter card 12 into card slot 14.

Monitor/timer circuit 21 senses the gate voltage of FET Q10 via the differential pair of transistors Q7 and Q8 to determine which mode of operation FET/feedback circuit 22 is operating. During the aforementioned constant-current mode, the gate voltage of FET Q10 is approximately 5.5 volts; during switched mode of operation, the gate voltage of FET Q10 is approximately 15 volts. Monitor/timer circuit 21 compares the gate voltage of FET Q10 to a 10 volt reference voltage established by the divider network formed by resistors R8 and R10. When the gate voltage of FET Q10 is less than 10 volts (constant-current mode), a mirrored current source formed by transistors Q5 and Q6 begins charging timing capacitor C2 with a source current of about 1 milliamp.

Latch circuit 20 monitors the voltage established across timing capacitor C2 and will activate if the voltage exceeds the zener voltage of diode D3 plus approximately 0.6 volts. The latch function is formed by transistors Q3 and Q4 and resistors R4 and R5 interconnected in the aforementioned SCR-type typology. Because latch circuit 20 is connected in parallel with the supply voltage reference of diode D5, when activated latch 20 clamps the supply voltage circuit to about 0.8 volts, deactivating FET/feedback circuit 22, thus opening the circuit between VBULK and load 11.

Resistor R15 provides a direct path from sense resistor R16 to the input of the latch of latch circuit 20, effectively bypassing monitor/timer circuit 21. This is done to provide a very fast feedback path to latch circuit 20 in order to deactivate FET Q10 should a transient fault current be detected between terminals OUT1 and OUT2 during normal operation of adapter card 12.

Note that one skilled in the art may embody the aforementioned circuit functions with the use of alternative transistor and resistor arrays.

The ON/OFF terminal may be coupled through card slot 14 to the processor-based system to thereby activate or deactivate current flow through transistor Q11 resulting in activation or deactivation of transistor Q10 to thereby open or close the circuit between VBULK and load 11. This ON/OFF operation may be manual, or it may be automatic as a function of some operation programmed within the processor-based system.

A typical operation of circuit 10 begins when switch Q10 is activated when voltage source VBULK is of a sufficient potential to activate bias circuit 105 through the ENABLE terminal. Bias circuit 105 senses the presence of this voltage, and activates switch Q10 if the voltage potential exceeds the voltage lock-out threshold established by diode D2.

Should the impedance of load 11 during hot-plugging of adapter card 12 be sufficiently low, switch Q10 will begin operating in the constant-current mode limiting current flow to a predetermined value. FET Q10 will continue to operate in the linear region as a true current (i.e., a signal) source as long as the impedance of load 11 (or the current magnitude through terminals OUT1 and OUT2 is high enough) to activate the constant-current mode of operation. Conversely, should the impedance of load 11 be sufficiently high, resulting in a current magnitude lower than the constant-current value previously described, switch Q10 will begin operating in a switched mode. The switched mode of operation is the normal operating state characterized by low series resistance and a minimal voltage drop between terminals OUT1 and OUT2. The switched mode of operation results in FET Q10 turning on or off according to the power needs of load 11.

Figure 3:
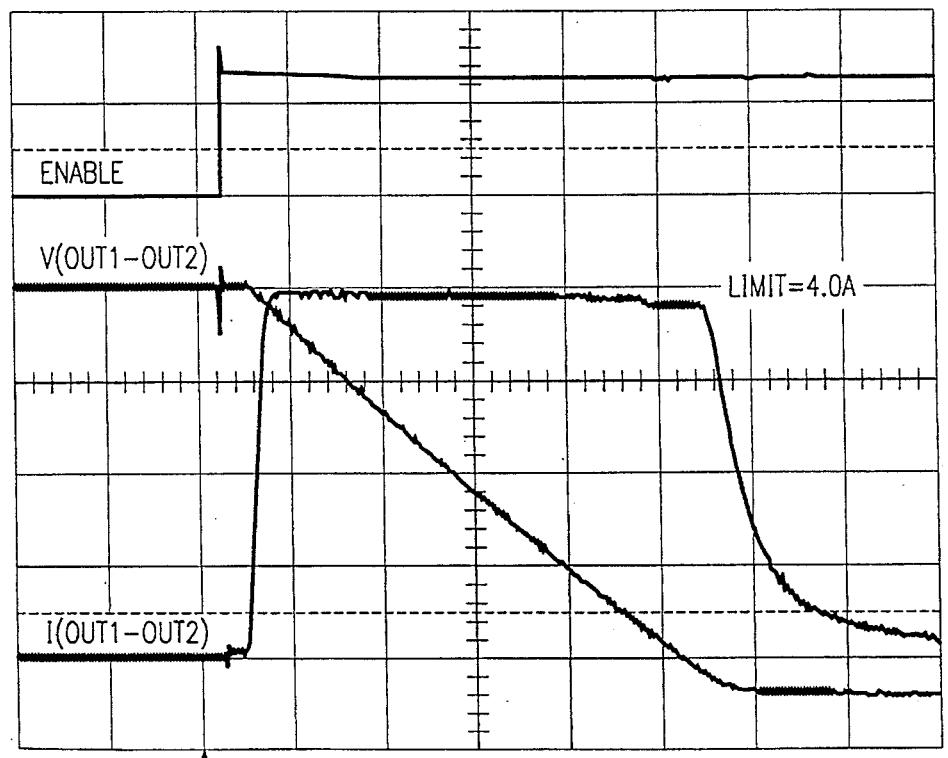
FIG. 3 illustrates measured enable, voltage and current waveforms during hot-plugging of the present invention when there is an input capacitance of 100 µF.

If the impedance of load 11 during hot-plugging is largely capacitive, switch Q10 will begin operation in a constant-current mode, charging the capacitance at a linear rate as illustrated within FIG. 3. Once the capacitance of load 11 is fully charged, switch Q10 automatically converts to a switched mode of operation. Switch Q10 will remain in this switched mode unless either an over-current fault condition through load 11 occurs or the input voltage at the ENABLE terminal drops below the aforementioned voltage lockout threshold value. At such time, bias circuit 105 will gate off MOSFET Q10, effectively opening the switch.

As previously described, adapter card 12 is activated through the following sequence: first, input voltage VBULK is interconnected to load 11 via connectors 101 and 103. No arcing occurs between card slot 14 and adapter card 12 because the ENABLE terminal of circuit 10 has not yet activated switch Q10. As seating of adapter card 12 continues, connector 102 is interconnected to the ENABLE terminal. The interconnection of multipin connector 104 with receive pins on card 12 (not shown) coupled to bus logic 13, concludes the plugging sequence.

Removal of adapter card 12 is the reverse sequence, allowing load 11 to deactivate before connectors 101 and 103 separate from corresponding receiving pins 107 and OUT2 on adapter card 12.

As previously described, monitor/timer circuit 21 in conjunction with latch circuit 20 insures that FET Q10 always operates within the safe operating area for allowable power dissipation by activating a timer sequence at the beginning of the constant-current mode. The monitor/latch functions will disable the current-limited circuitry of circuit 22 should the predetermined time limit established by the components within circuits 20 and 21 allowed for constant-current mode operation expire. Thus, FET Q10 (and the entire system) is protected should there be a sustained low impedance fault state on adapter card 12 during a hot-plug.

Prior art hot-plugging topologies which incorporate the use of multi-length conductor connectors usually require stabilization of the logic supply voltage within the adapter card before the bus driver/receivers can be connected to the backplane. However, the input capacitance of the associated adapter card slows the time required to activate and stabilize the logic supply voltage, and creates an exposure of disrupting the bus should the driver/receiver pins connect before the supply voltage has stabilized. One of the present invention's most important features is that it provides a means of minimizing the time duration required for charging the input capacitance of load 11 to near theoretical limits by sourcing the maximum amount of current possible to load 11 without disturbing input bulk voltage VBULK. The constant-current magnitude resulting from the chosen component values within circuit 10 is designed to be a value which will not over-burden bulk supply VBULK even if the power system is operating at full capacity. This maximum current level is maintained during the full charge duration.

If adapter card 12 uses on-card DC/DC converters within load 11 to generate the supply voltages for bus logic 13, these converters need not be gated active at any special time. Rather, the present invention allows the converters to turn on whenever the input voltage is high enough to activate normal operation, further minimizing the time required to stabilize the logic supply voltage. Several other prior hot-plugging methodologies require a time delay before the converters are allowed to activate in order to prevent oscillation resulting from turning on into a high-source impedance.

Capacitor C3 used to stabilize the negative feedback loop within circuit 22 also impedes the di/dt of the rising edge of the input current waveform, reducing both conductive and radiated noise which could otherwise be a source of EMI disturbances and adversely degrade the performance of the rest of the system.

Figure 4:
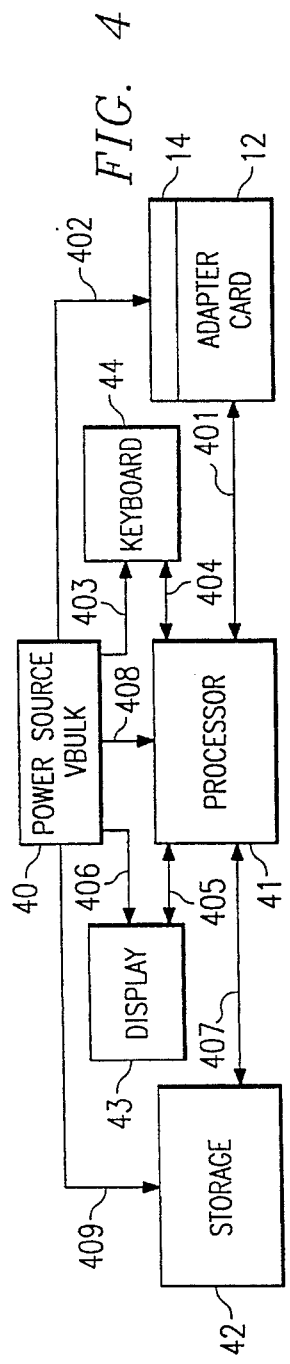
FIG. 4 illustrates a processor-based system utilizing the present invention.

Referring next to FIG. 4, there is shown the aforementioned processor-based system which utilizes the advantages of the present invention. Processor 41 is coupled to storage device 42, display device 43, keyboard 44 and card slot 14 through connections 407, 405, 404 and 401. Power source 40 provides power to storage device 42, display 43, keyboard 44, processor 41 and card slot 14 through connections 409, 406, 403, 408 and 402. As illustrated, adapter card 12 is coupled to card slot 14 so that voltage source VBULK within power source 40 is applying energy to adapter card 12. Connector 401 from processor 41 to card slot 14 enables processor 41 to couple to bus logic 13 through multipin connector 104 illustrated in FIG. 1.

In summary, the capability for hot-plugging adapter cards is very important for computer systems in order to support non-disruptive growth, change, or service. The invention disclosed herein describes a current-limited intelligent switching device which allows hot-plugging adapter power connectors with minimal pin damage and system disturbance.

This invention provides solutions for many of the problems frequently encountered when hot-plugging adapter cards. These problems/solutions are summarized below:

1. Many of the problems encountered with hot-plugging are due to resultant arcing across the electrical contacts while the interconnection is being made or broken. This resultant arcing can severely damage pin contacts by pitting their surface metal. This invention provides a means of minimizing pin arcing.

2. The large di/dt value associated with the near instantaneous connection of the power pins can be the source of both conductive and radiated noise which may adversely degrade the performance of the rest of the system. This is particularly severe when hot-plugging an adapter card with high input capacitance. This invention provides a means of limiting di/dt to a much more acceptable value.

3. Hot-plugging topologies which incorporate the use of multi-length conductor connectors may require stabilization of the logic supply voltage before the signal pins can be connected. However, capacitance on the card slows the time required for supply voltage stabilization, and creates an exposure of disrupting the bus should the signal pins connect before the supply voltage has stabilized. This invention provides a means of minimizing time duration required to charge input capacitance to near theoretical limits with minimal impact to the system.

In a networking system where high availability/fault tolerance is required, hot-plugging a defective card with a low impedance fault (i.e., short circuit) can cause an unacceptable single-point failure. Likewise, a card which develops a low impedance fault during operation can also create a single-point failure. This invention provides a means of quickly isolating the defective card away from the rest of the system until it can be replaced through the use of circuit 20. This protection mechanism is resettable via a remote on/off feature (through the ON/OFF terminal), and clears the fault state about one hundred times faster than a fast-acting fuse.

This invention also provides the following advantages:

1. The capability is provided for remotely powering down existing adapter cards through an internal gating mechanism via circuit 20 and the ON/OFF terminal.

2. A low input voltage lock-out feature is provided which powers off card 12 if input voltage VBULK drops below a predetermined threshold. Normal operation is automatically resumed when input voltage VBULK returns to the normal operating level.

3. An adapter card which has been powered off due to the detection of a fault current may be reset either by the aforementioned remote enabling sequence or by manually reseating adapter card 12.

Although the present invention and its advantages have been described in detail, it should be understood that various changes, substitutions and alterations can be made herein without departing from the spirit and scope of the invention as defined by the appended claims.

What is claimed is:

1. An adapter card adaptable for hot-plugging into a card slot coupled to a processor-based system and an energy source for powering said system, said adapter card including electrical components and a transferring means for transferring electrical energy received from said energy source to said components, said transferring means of said adapter card comprising:

a first circuit for controlling application of said electrical energy to said transferring means wherein said first circuit comprises a means for limiting current flow from said energy source to said electrical components, said means for limiting being operable in at least two modes wherein a first mode of said at least two modes is a current limiting mode in which said means for limiting acts as a current source and wherein a second mode of said at least two modes is a normal operation mode in which impedance is minimized to allow unlimited current flow from said energy source to said components; and a second circuit, coupled to said first circuit, for selectively coupling said first circuit to said energy source as a function of a level of said electrical energy.

2. The adapter card as recited in claim 1 wherein said second circuit comprises:

a first zener diode coupled between a base electrode of a first transistor and a first terminal;

a first resistor coupled between said first terminal and an emitter electrode of said first transistor;

a second zener diode coupled between said first terminal and a base electrode of a second transistor, a collector electrode of said second transistor coupled to said base electrode of said first transistor;

a second resistor coupled between an emitter electrode of said second transistor and a second terminal; and a third resistor coupled between said base electrode of said second transistor and said second terminal, wherein a collector electrode of said first transistor is coupled to said first circuit, said first and second terminals adaptable for coupling to said energy source.

3. An adapter card adaptable for hot-plugging into a card slot coupled to a processor-based system and an energy source for powering said system, said adapter card including electrical components and a means for transferring electrical energy received from said energy source to said components, said adapter card comprising:

a first circuit for controlling application of said electrical energy to said transferring means; and a second circuit, coupled to said first circuit, for causing said first circuit to remove application of said electrical energy to said transferring means when said transferring means has limited current flow and operated at a current source for said components for a specified amount of time.

4. The adapter card as recited in claim 3 wherein said second circuit comprises:

a first resistor coupled between said first circuit and a base electrode of a first transistor and a collector electrode of a second transistor, wherein a base electrode of said second transistor is coupled to a collector electrode of said first transistor;

a capacitor coupled between said base electrode and an emitter electrode of said second transistor; and a second resistor coupled between said base electrode and an emitter electrode of said second transistor, wherein said emitter electrode of said second transistor and said emitter electrode of said first transistor are each coupled to said first circuit.

5. The adapter card of claim 4 which further comprises:

an input line coupled to a first end of a third resistor, wherein said third resistor includes a second end which is connected to a fourth resistor for sampling, which input line carries any transient signals appearing on said fourth resistor for sampling wherein said electrical energy is unclamped by said second circuit whenever said transient fault signals appear on said input line.

6. An adapter card adaptable for hot-plugging into a card slot coupled to a processor-based system and an energy source for powering said system, said adapter card including electrical components and a transferring means for transferring electrical energy received from said energy source to said components, said adapter card comprising:

a first circuit for controlling application of said electrical energy to said transferring means; and a second circuit, coupled to said first circuit, for causing said first circuit to remove application of said electrical energy to said transferring means when said transferring means has limited current flow and is operated as a current source for said components for a specified period of time.

7. The adapter card as recited in claim 6 wherein said second circuit comprises:

a base electrode of a first transistor coupled to said first circuit, wherein a collector electrode of said first transistor is coupled to a first terminal;

a diode and a first resistor coupled between an emitter electrode of said first transistor and a second terminal;

an emitter electrode of a second transistor coupled to a junction of said first resistor and said diode;

a collector electrode of a third transistor coupled to a collector electrode of said second transistor and to a base electrode of said third transistor;

a second resistor coupled between said first terminal and an emitter electrode of said third transistor;

a third resistor coupled between said first terminal and a base electrode of said second transistor;

a fourth resistor coupled between said base electrode of said second transistor and said second terminal;

a base electrode of a fourth transistor coupled to said base electrode of said third transistor;

a fifth resistor coupled between said first terminal and an emitter electrode of said fourth transistor;

a capacitor coupled between a collector electrode of said fourth transistor and said second terminal; and a third circuit in an SCR configuration coupled to said collector electrode of said fourth transistor and coupled between said first and second terminals, wherein said first and second terminals are each coupled to said first circuit.

8. The adapter card of claim 7 which further comprises:

an input line coupled to a first end of a sixth resistor, wherein said sixth resistor includes a second end which is connected to a seventh resistor for sampling, which input line carries any transient signals appearing on said seventh resistor for sampling wherein said electrical energy is unclamped by said second circuit whenever said transient fault signals appear on said input line.

9. A circuit for controlling current flow to a load during and subsequent to an instantaneous application of an energy source to said load, said circuit comprising:

means for switching said current flow "on" or "off";

means, coupled to said switching means, for monitoring said current flow;

means, coupled to said switching means and said monitoring means, for controlling said switching means wherein said means coupled to said switching means and to said monitoring means limits current flow whenever said current flow being monitored exceeds a predetermined amount;

means for placing said switching means in an "off" operating state when said switching means has been in an "on" operating state for a specified period of time; and means, coupled to said switching means, for limiting a rate of increase of said current flow.

10. The circuit as recited in claim 9, further comprising:

means for monitoring said energy source; and means, coupled to said energy source monitoring means, for selectively operating said switching means as a function of a monitored level of said energy source.

11. The circuit as recited in claim 9, further comprising:

means for placing said switching means in an "off" operating state when said current flow exceeds a specified level.

12. The circuit as recited in claim 9, wherein said circuit and said load are components on an adapter card adaptable for insertion into a card slot coupled to a processor-based system and an energy source for powering said system.

13. The circuit as recited in claim 9, wherein said switching means includes a FET and said monitoring means includes a resistor coupled in series with said FET and said load.

14. A processor-based system adaptable for receiving an adapter card, said system comprising:

a processor;

a storage device coupled to said processor;

an input means coupled to said processor;

an output means coupled to said processor;

an energy source coupled to said processor; and a card slot coupled to said processor and to said energy source, wherein said card slot is adaptable for coupling with said adapter card, said adapter card including a circuit for controlling current flow to a load during and subsequent to an instantaneous application of said energy source to said load, said circuit comprising:

means for switching said current flow "on" or "off";

means, coupled to said switching means, for monitoring said current flow;

means, coupled to said switching means and said monitoring means, for controlling said switching means wherein said means coupled to said switching means and to said monitoring means limits current flow whenever said current flow being monitored exceeds a predetermined amount;

means for placing said switching means in an "off" operating state when said switching means has been in an "on" operating state for a specified period of time; and means, coupled to such switching means, for limiting a rate of increase of said current flow.

15. The processor-based system as recited in claim 14 wherein said card slot includes:

connector means for coupling said adapter card to said card slot, said connector means having reference, first and second engageable contact means, said first and second contact means coupled together, said reference, first and second contact means coupled to said energy source, said contact means being spatially positioned on said card slot to couple to corresponding contact means on said adapter card such that, on insertion of said adapter card into said card slot, said reference contact means engages and said first contact means engages their corresponding contact means before said second contact means engages its corresponding contact means on said adapter card, wherein said first and reference contact means are adapted for coupling said energy source to said load, and said second contact means is adapted for coupling said energy source to said switching means, said monitoring means and said controlling means.

16. In a processor-based system, a method for controlling current flow to a load on an adapter card when hot-plugging said adapter card to a card slot coupled to such system, said current flow originating from an energy source coupled to said system, said method comprising the steps of:

activating a switch, coupled in series with said load, to an "on" operating state to thereby apply said current flow to said load;

measuring a length of time said switch is in said "on" operating state; and deactivating said switch to an "off" operating state when a specified length of time for said switch to be in said "on" operating state has been measured to thereby remove said current flow to said load.

17. The method as recited in claim 16, further comprising the steps of:

monitoring a magnitude of said current flow; and deactivating said switch to an "off" operating state when a specified magnitude of said current flow has been monitored.

18. The method as recited in claim 16, further comprising the steps of:

monitoring a magnitude of electrical energy emanating from said energy source; and deactivating said switch to an "off" operating state when a magnitude of said monitored electrical energy falls below a specified minimum level.

19. The method as recited in claim 16 wherein said system comprises:

a processor coupled to said card slot;

a memory storage device coupled to said processor;

an input device coupled to said processor; and an output device coupled to said processor, wherein said energy source is coupled to said processor and to said card slot.

20. In a processor-based system, a method for preventing arcing of electrical energy between connector means during removal of an adapter card from a card slot coupled to said system, said electrical energy originating from an energy source coupled to said system, said connector means providing a path for said electrical energy to a load on said adapter card when said adapter card is coupled to said card slot, said method comprising the steps of:

comparing a voltage level of said electrical energy being applied to said load to a threshold value; and removing said electrical energy from said load when said voltage level of said electrical energy falls below said threshold value.

21. The method as recited in claim 20 wherein said removing step comprises the step of:

opening a switch placed in series with said load.

22. An adapter card, which adapter card includes an interface circuit for allowing said adapter card to be plugged into a hot socket, comprising:

a plurality of sockets arranged to receive a plurality of socket pins wherein at least one socket pin is of a different length than the remainder of said plurality of socket pins;

a current limiting circuit connected between an energy source and a load, which current limiting circuit includes means for sensing current magnitude from said energy source to said load and means for limiting current flow until a sensed current drops down to a predetermined level and wherein said means for limiting current flow is capable of being switched to a normal state to minimize impedance between said energy source and said load whenever said sensed current drops down to said predetermined level, said means for limiting current flow comprising:

a latch circuit for clamping said energy source so long as normal operating conditions exist;

a monitor/timer circuit for charging a capacitor to engage said latch circuit;

a feedback circuit for sensing current magnitude and for activating said current limiting circuit and for minimizing ohmic impedance of said current limiting circuit depending upon said instantaneous current rate; and a bias circuit for coupling said energy source to said feedback circuit, said monitor/timer circuit and said latch circuit whenever said energy source exceeds a predetermined voltage potential.

23. An adapter card adaptable for hot-plugging into a card slot coupled to a processor-based system and an energy source for powering said system, said adapter card including electrical components and a transferring means for transferring electrical energy received from said energy source to said components, said transferring means of said adapter card comprising:

current selecting mode means for operating in three modes wherein a first mode no current flow is output, and wherein a second mode unrestricted current flow is output, and wherein a third mode restricted current flow is output, and wherein said current selecting mode means operates as a current source while in said third mode;

means, coupled to said current selecting mode means, for monitoring said current flow;

means, coupled to said current selecting mode means, and said monitoring means, for controlling said current selecting mode means;

means, coupled to said current selecting mode means for, for placing said current selecting mode means in an "off" operating state when said current selecting mode means has been in an "on" operating state for a specified period of time;

means, coupled to said current selecting mode means, for placing said current selecting mode means in an "off" operating state when said current flow exceeds its specified level; and means, coupled to said current selecting mode means for, for limiting said current flow.

\* \* \* \* \*